United States Patent [19]

Hawkins et al.

[11] Patent Number: 4,948,839
[45] Date of Patent: Aug. 14, 1990

[54] COMPOSITION

[75] Inventors: Christopher M. Hawkins, Evansville; Robert R. Gallucci, Mt. Vernon, both of Ind.

[73] Assignee: General Electric Company, Mt. Vernon, Ind.

[21] Appl. No.: 243,372

[22] Filed: Sep. 12, 1988

[51] Int. Cl.$^5$ ............................................. C08G 81/02
[52] U.S. Cl. ...................................... 525/92; 525/132; 525/146; 525/148; 525/149
[58] Field of Search ............... 525/146, 148, 149, 132, 525/168, 67, 64, 68, 92

[56] References Cited

U.S. PATENT DOCUMENTS

| 3,256,362 | 6/1966 | Craubner | 525/168 |
| 3,462,515 | 8/1969 | Cantrill | 525/146 |
| 4,081,422 | 3/1978 | Cordes | 525/168 |
| 4,496,693 | 1/1985 | Rosenquist | 525/146 |

Primary Examiner—Patricia Short
Attorney, Agent, or Firm—Martin B. Barancik

[57] ABSTRACT

A composition comprising a modified polyester, said modification being in the additional presence in the backbone of the polyester unsaturated aliphatic diester repeating units, the said modified polyester being covalently bonded to a polyolefin.

23 Claims, No Drawings

COMPOSITION

BACKGROUND OF THE INVENTION

Various polyesters such as aromatic polycarbonates, aromatic copolyestercarbonates and polyarylates have been known to the art for many years. These materials have very good characteristics such as toughness, high temperature resistance, high modulus, and reasonable to high impact resistance. However, these materials have generally been lacking in various areas due primarily to their amorphous character. For example, solvent resistance has not been necessarily considered a strong point in the above-mentioned aromatic polyesters. Additionally impact resistance above the critical thickness of the materials has also been thought to be wanting with respect to certain desirable applications of the materials. In order to upgrade these weaker properties while still attempting to maintain the desirable properties of these polyesters, blends have been made utilizing the polyesters in various crystalline materials. Perhaps the most studied blends have been these aromatic polyesters with a polyolefin. However, it has been found that although some of these desired properties can be partially achieved in the blends, there are certain disadvantages also observed in the blends. For example, compatibility problems occur with great frequency. There is a great tendency for molded parts to delaminate. The two components are not well dispersed in each other as shown by photomicrographs. Therefore, there still exists a need for obtaining an aromatic polyester polyolefin composition which maintains a significant number of the desirable characteristics of the aromatic polyester or polyolefin while upgrading properties of either the polyester or polyolefin which would be desirable.

We have discovered a new composition of matter which upgrades various properties of the aromatic polyester or polyolefin. The problem with delamination has been significantly reduced and photomicrographs show superior dispersion when compared to standard aromatic polyester polyolefin compositions.

SUMMARY OF THE INVENTION

In accordance with the invention there is a composition comprising a modified polyester, said modification being the additional presence in the backbone of the polyester unsaturated aliphatic diester repeating units, the said modified polyester being covalently bonded to a polyolefin.

Additionally there is a process for preparing a composition comprising a polyolefin covalently bonded to a modified polyester which comprises contacting together (1) a polyolefin;
(2) a free radical initiator effective at a temperature at which a polyolefin and modified polyester can be melt processed; and
(3) a modified polyester said modification being the presence in the backbone of the polyester unsaturated aliphatic diester repeating units, said contacting carried out at a temperature sufficiently high so that both the polyolefin and modified polyester are melt processable together.

DETAILED DESCRIPTION OF THE INVENTION

The amorphous aromatic polyesters suitable for this invention include the polycarbonates, copolyestercarbonates and polyarylates containing unsaturated aliphatic diester linkages. The aromatic polycarbonate resins suitable for use herein as component (a) may be prepared by reacting a dihydric phenol with a carbonate precursor, such as phosgene, a haloformate or a carbonate ester and an unsaturated aliphatic diester precursor. Typically, such carbonate polymers are represented as comprising recurring structural units of the formula:

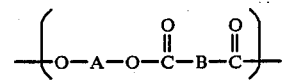

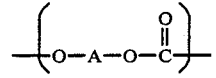

wherein A is a divalent aromatic radical of the dihydric phenol employed in the polymer producing reaction and B is the unsaturated aliphatic radical. Preferably, the carbonate polymers used to provide the resinous mixtures of the invention have an intrinsic viscosity (as measured in methylene chloride at 25° C.) ranging from about 0.30 to about 1.70 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:

2,2-bis-(4-hydroxyphenyl)propane;
hydroquinone;
resorcinol;
2,2-bis-(4-hydroxyphenyl)pentane; biphenol
2,4''-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2'-dihydroxydiphenyl;
2,6-dihydroxynaphthalene;
bis-(4-hydroxyphenyl)sulfone;
bis-(3,5-dimethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
4'4'-dihydroxydiphenyl ether;
4,4'-dihydroxy-3,3'-dichlorodiphenyl ether;
4,4'-dihydroxy-2,5-dihydroxydiphenyl ether; and the like.

Other dihydric phenols which are also suitable for use in the preparation of the above polycarbonates are disclosed in U.S. Pat. Nos. 2,999,835; 3,038,365; 3,334,154 and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos. 4,018,750 and 4,123,426, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy- or acid-terminated polyester or with dibasic acids in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use herein is a polymer derived from 2,2-bis(4- hydroxyphenyl)propane (bisphenol-A) with fumarate diester linkages.

The aromatic copolyestercarbonates which can be employed in this invention include those aromatic polymers with ester and carbonate repeating units as those found in U.S. Pat. No. 3,169,121; 4,287,787; 4,156,069; 4,260, 731 and the like, each incorporated by reference. Of the aforementioned polymers, the polymers utilizing bisphenol-A as the dihydric phenol are preferred. Methods for preparing the polymers are well known and are described in the references cited above. The unsaturated aliphatic diester units are also present in the polymer.

Polyarylates are polymers having all ester linkages. They are generally prepared from dihydric phenols and phthalic acids although any aromatic diacid or diphenol can be employed. These polymers and their methods of preparation are well known, for example see U.S. Pat. No. 4,663,421, and are available commercially, for example under the tradename ARDEL from AMOCO. The dihydric phenol preferably employed is bisphenol-A and the aromatic diacid is terephthalic, isophthalic or a combination of the two. The unsaturated aliphatic diester units are also present in the polymer.

The unsaturated aliphatic diester linkages in the aromatic polyesters arise from an unsaturated dicarboxylic acid, dicarboxylic acid anhydride or dicarboxylic acid ester precursor. These agents include such materials as maleic acid, fumaric acid, itaconic acid, cyclohexene dicarboxylic acid, norbornene dicarboxylic acid, citraconic acid, the ester precursors thereof such as, for example, the acid chlorides and the anhydrides thereof when they are structurally feasible. Generally these acids or acid anhydrides are in the group illustrated by the Formulae:

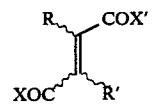

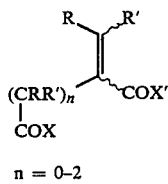

n = 0-2

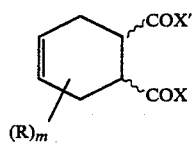

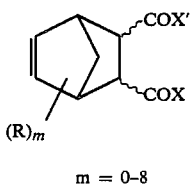

m = 0-8 or the dicarboxylic acid analogues or ester precursors, preferably acid halides thereof wherein R and R' are the same or different and are hydrogen, alkyl of one to six carbon atoms, inclusive, aryl of six to twelve carbon atoms, inclusive and Cl or Br.

X and X' are the same or different and are Cl, Br, OH, O-alkyl, O-aryl, O-metallic cation, alkyl and aryl are identified as above or X and X' are joined together and are an oxygen atom forming an anhydride linkage wherein the structure permits.

The letter n is an integer from 0-2. The letter m is an integer of 0 to 8. Examples of metallic cations are the cations of sodium, potassium, calcium and zinc.

The nature of X which is most preferred will vary with the type of process used to prepare the unsaturated polymer. For example, in an interfacial polymerization process X=Cl is preferred. In a melt transesterification polymerization process X=O-alkyl, or O-aryl is preferred. R and R' are preferably selected from hydrogen, alkyl of one to three carbon atoms, and phenyl, inclusive, R is preferably the same as R'. It should be noted that in the context employed aliphatic also includes cycloaliphatic.

The polyolefins which are useful in this invention include polyolefins made from olefins having from 2 to about 10 carbon atoms, preferably alphaolefins. Examples of such polyolefins include polypropylene, polyethylene, polybutylene and polymers made from the butadienes. The polyolefin may also be a copolymer wherein the comonomer may be an olefin or a comonomer which behaves in an olefinic like manner in the radical polymerization methods. For example ethylene propylene rubber copolymers are included in the invention as well as styrenic comonomers such as styrene, alphamethyl styrene, paramethyl styrene and the like. Acrylic comonomers such as acrylonitrile, acrylic acid and esters such as ethyl acrylate or N-butyl acrylate can also be employed. Examples of such polyolefin polymers include ethylene ethylacrylates such as Union Carbides DPD-6169, ethylene styrene, styrene butadiene styrene block copolymers such as the Kraton series available from Shell, and the like. The preferred polyolefins include polyethylene, polypropylene, hydrogenated styrene-butadiene block copolymer, acrylonitrile butadiene-styrene type polymers and ethylene propylene rubber.

The modified polyesters of the invention are prepared in the usual manner that the standard polyesters are prepared except that an unsaturated aliphatic diester forming compound is added initially or during the preparation of the basic polymer. For example, with polycarbonate a typical interfacial process may be used wherein the unsaturated aliphatic diester precuror is added initially to the dihydric phenol, the solvent and catalyst thereby making an aliphatic polyester oligomer. After the preparation of the oligomer the phosgene and endcapping agent are added and the reaction allowed to go to completion thereby forming the aromatic polycarbonate with unsaturated aliphatic diester linkages. With respect to the most common unsaturated aliphatic diesters incorporated into the backbone, such as a fumaric acid, the acid chlorides are used, for example, fumaryl chloride is employed as the starting material in the preparation of the polymer. Such procedures may also be followed when preparing the modified aromatic copolyestercarbonate and also the modified polyarylate.

The quantity of unsaturated aliphatic diester units present in the backbone of the polyester is not unduly significant. However there should be sufficient quantity of unsaturated aliphatic diester present in the backbone so that covalent bonding with the polyolefin can occur. From the studies done for this application, it appears that the bonding between the polyolefin and the modified polyester occurs to a very great extent through the unsaturation present in the unsaturated aliphatic diester units. Therefore a minimum amount should be present which permits the covalent bonding to occur. Generally, from 0.5 to about 20 mole percent as measured on the moles of dihydric phenol present can be employed. Preferably from about 1 to about 10 mole percent units of unsaturated aliphatic diester are present in the polymer backbone.

The covalent bonding can be made to occur with the modified polyester in a variety of environments. It can be done in a solution chemistry or in the melt stage, for example. It is preferably done in the melt stage as, for example, in an extruder or blender. Initiating the covalent bonding process can be accomplished with a free radical initiator. A catalytic quantity of free radical initiator is employed. Generally this may range from a minimum of about 0.05 wt. % as measured by the polyester to about 5 wt. %. When used in the melt process, it should be a free radical initiator which dissociates into free radicals at a temperature which is compatible with the melt processing temperature of mixtures of the polyolefin and modified polyester. Clearly free radical initiators which dissociate into free radicals below the melt processing temperature of the admixture of polyolefin and modified polyester are less appropriately employed in this process. Examples of effective free radical initiators include cumene hydroperoxide, dicumyl peroxide and 2,2'-azobis(2-acetoxypropane) sold as Luazo AP from Pennwalt. As employed in the melt process, the polyolefin, modified polyester and free radical initiator are mixed together in the melt. This can be done in an extruder barrel or in a separate container. The admixing occurs for an appropriate time period, for example, from 10 seconds to several minutes at the melt processing temperature and then the composition is cooled and utilized in a manner wherein the usual applications of the polyester or polyolefin can be employed. Upgrading of various properties of the polyolefin and modified polyester are observed which are not observed with general admixtures of the two components. The quantities of polyolefin and modified polyester which can be contacted is not critical. From about 5 percent to 95 percent polyolefin and from about 95 percent to 5 percent modified polyester may be employed. Preferably from about 25 to 75 weight percent polyolefin and 75 to 25 weight percent modified polyester can be employed. The weight percents are calculated on the total quantities of polyolefin and modified polyester present.

Below are specific examples of procedures for preparing the modified polyester as well as procedures for preparing the polyolefin covalently bonded to the modified polyester as well as test results showing the presence of the covalently bonded inventive composition and results also showing the improvements in the composition relative to the polyolefin or modified polyester admixture where there is essentially no covalent bonding between the polyolefin and modified polyester or the polyolefin or modified polyester per se.

EXAMPLE 1

PREPARATION OF FUMARATE MODIFIED POLYCARBONATE

A 2 L four neck Morton flask was fitted with a mechanical stirrer, a pH probe, a gas inlet tube and a Claisen adapter to which was attached a dry ice condenser and an aqueous caustic inlet tube. To the flask was added methylene chloride (600 mL), $H_2O$ (300 mL), bisphenol-A (108.3 g, 0.475 mole), and triethyl amine (0.5 g, 0.005 mole). Fumaryl chloride (3.83 g, 0.025 mole) was dissolved into 50 mL of methylene chloride and added to the stirring mixture over 5 minutes. pH was maintained at 10.5. The reaction was stirred for an additional 5 minutes at pH 10.5. Phenol (1.88, 0.020 mole) was then added. Phosgene was added at 2 g/min. for 32 minutes, pH 10–11. After 10 minutes of nitrogen purge the organic phase was separated from the brine. The organic phase was washed once with 500 mL of 1% HCl and three times with 500 mL $H_2O$. The pH of the water washes were 0, 5, and 7 respectively. The solution was diluted to 1 L with $CH_2Cl_2$ and precipitated into 2 L of MeOH over 15 minutes. After drying in the 125° C. oven overnight 98.1 g of powder was recovered. IV=0.463 dl/g, KI=2290 csec, Tg=151° C., Mw=31400, Mn=12100, DISP=2.67.

The Kasha Index (KI) is a measurement of the melt viscosity of the resin. The procedure for determining the Kasha Index is as follows: 7 grams of resin pellets, dried a minimum of 90 minutes at 125° C. are added to a Tinius-Olsen model T3 melt indexer; fitted with a timing device the temperature in the indexer is maintained at 300° C. and the resin is heated at this temperature for 6 minutes; after 6 minutes the resin is forced through a 1.05 mm radius orifice using a plunger of radius 4.7 mm and an applied force of 7.7 kgs. The time required for the plunger to travel 5.1 cm is measured in centiseconds; this is reported as the KI. The higher the KI, the higher the melt viscosity and the more viscous the resin, and the harder or more difficult the processability.

EXAMPLE 2

PREPARATION OF A COVALENTLY BONDED POLYOLEFIN

TO A MODIFIED POLYESTER AND COMPARISON

TO A SIMILAR COMPOSITION PREPARED FROM

A NON-MODIFIED POLYESTER AND POLYOLEFIN

MELT BONDING THE 5% (MOLE) FUMARATE

POLYCARBONATE TO POLYETHYLENE

The following procedure was used to perform the grafting. Polyethylene (Petrothene NA 117-00 from USI Chemical), 17.5 g, was mixed with a polycarbonate without fumarate bonds and an additional 17.5 g polyethylene mixed with a fumarate containing polycarbonate (32.5 g) prepared above in Example 1. Each of these sets were divided in two, placed into a mixing bowl which was being mixed at 50 rpm and heated to the desired temperature, one subset of material at 250° C, the other subset at 275° C. After 5 minutes of mixing each set, the catalyst (0.050 g) was added. The catalyst added at each of these temperatures was dicumyl peroxide or 2,2'-azobis(2-acetoxypropane). The samples were then heated for an additional 10 minutes. After cooling pane). Luperox 802 is a-a-bis(t-butylperoxy)diisopropylbenzene.

| FORMULATION | TENSILE Y psi | TENSILE B psi | TENSILE E % | DTUL °F. @ 66 psi | ⅛" NOTCHED* IZOD ft. lb/in |
|---|---|---|---|---|---|
| PE | 2030 | 1740 | 85 | 116 | 6.2 |
| PE + Luperox 802 | 2340 | 1800 | 75 | 138 | 7.0 |
| PE + Luazo AP | 2340 | 2130 | 70 | 116 | 6.8 |
| PE + PC | 2500 | 2200 | 67 | 196 | 2.0 |
| PE + PC + Luperox 802 | 2360 | 2270 | 20 | 207 | 2.0 |
| PE + PC + Luazo AP | 2400 | 2100 | 27 | 197 | 2.4 |
| PE + mod PC | 1600 | 1300 | 43 | 173 | 1.6 |
| PE + mod PC + Luperox 802 | 2070 | 1990 | 28 | 196 | 1.6 |
| PE + mod PC + Luazo AP | 2300 | 2200 | 41 | 176 | 8.4 |

*2 lb. hammer each sample was dissolved in refluxing chlorobenzene and precipitated in methylene chloride. The resulting material was analyzed by infrared spectroscopy.

The carbonyl region of the infrared spectra show an absorbance at 1780 cm-[1] only for samples prepared using polycarbonate fumarate copolymer. The absorbance is due to the presence of carbonate carbonyl groups and is indicative of chemical bonding between the furmarate copolymer and the polyolefin. The polyester graft polyolefin will enhance the mixing of the remaining polyester and polyolefin., acting as a compatibilizing agent. This graft copolymer is not formed in blends of the unmodified polycarbonate and polyolefin.

EXAMPLE 3

PHYSICAL PROPERTIES OF COMPOSITIONS OF THE INVENTION COMPARED TO COMPOSITIONS PREPARED WITH NO FREE RADICAL INITIATOR OR LESS EFFECTIVE FREE RADICAL INITIATOR

In the experiments below the polycarbonate employed was a bisphenol-A polycarbonate with an IV at 30° C. in methylene chloride of 0.48 dl/g, the modified polycarbonate was a bisphenol-A polycarbonate copolymer with 4.4 mole % fumarate linkages prepared in a method similar to Example 1, 30° C. MeCl$_2$ IV=0.451 dl/g, MW=26700, MN=12200, DISP=2.31, Tg=150° C., KI=3730 csec.

The polyethylene used in the experiments below was low density polyethylene (Petrothene NA 117-00 from USI Chemical, melt flow =7.5, density =0.915, with no additives).

The formulation and extrusion conditions used in the experiments below were 70 wt. % polyethylene, 30 wt. % polycarbonate (or polycarbonate/fumarate copolymer), 0.3 wt. % radical initiator. All material was dry blended prior to extrusion. Extruder is a 30mm corotating twin screw. The materials were extruded at 330° C. as measured at the diehead and molded at 200– 250° C. into various test pieces. Feed rate =17 lb/hr. Screw speed =50 rpm.

In the test results below the test systems employed were: tensile, ASTM D638; DTUL 66 psi, ASTM D648; and ⅛ inch Notched Izod ASTM D256 (a 2 lb. hammer was employed). All the compositions gave 100% ductile breaks. PC is polycarbonate. Mod PC is the polycarbonate with fumarate units. PE is polyethylene. Where free radical initiator was used it was present at 0.3 wt. %. Luzao AP is 2,2'-azobis(2-acetoxypropane).

To summarize, using the correct initiator, Luazo AP, the following results are present. The covalent bonded material containing composition with the modified polycarbonate has a higher impact resistance, 8.4, to polyethylene alone, 6.8. Compared to polyethylene, DTUL 116° F., it has a much higher DTUL, 176° F. Additionally, the solvent resistance, as measured in methylene chloride is substantially greater for the material of the invention as opposed to polycarbonate.

EXAMPLE 4

QUANTITATIVE MEASURE OF COVALENTLY BONDED POLYOLEFIN TO MODIFIED POLYESTER

COMPARISON OF QUANTITY OF COVALENTLY BONDED POLYETHYLENE TO MODIFIED POLYCARBONATE AND NON-MODIFIED POLYCARBONATE UTILIZING DIFFERENT FREE RADICAL INITIATORS

The extent of bonding in the fumarate/polycarbonate copolymer blends with polyethylene has been quantitated via proton NMR and compared to blends of polyethylene with non-modified polycarbonate. The experiments utilized no free radical initiators or differing free radical initiators. The polycarbonate, modified polycarbonate, as well as the blend and polyethylene analyzed material were the same as used or made in Example 3. 0.02 wt. % bonded material was the minimum detectable limit of the test procedure. Below are the results.

| INITIATOR | PC | MODIFIED PC | WT. % PC BONDED TO PE |
|---|---|---|---|
| None | X | | Not detected |
| None | | X | 0.2 |
| Luperox[1] 802 | X | | Not detected |
| Luperox[1] 802 | | X | 0.1 |
| Luazo AP[2] | X | | Not detected |
| Luazo AP[2] | | X | 1.3 |

[1] a-a-bis(t-butylperoxy)diisopropylbenzene
[2] 2,2'-azobis(2-acetoxypropane)

As demonstrated from the data, standard polycarbonate, with no unsaturated ester modification, does not provide any bonding with polyethylene above the minimum detectable limit of the assay. With respect to modified polycarbonate, the absence of free radical initiator and the presence of a free radical initiator, Luperox 802, which dissociates at a temperature below the melt processing temperature is accompanied by a very small quantity of bonding between the polyethylene and the modified polycarbonate. However, the presence of a more effective free radical initiator, Luazo AP, brings about a significant quantity of bonding between the polyethylene and the modified polycarbonate, approximately six (6) times that achieved wherein there is no, or a less effective, radical initiator.

Improved mechanical compatibility was also demonstrated with a step chip molded from the invention composition that does not delaminate upon bending as opposed to a standard polycarbonate polyethylene blend which grossly delaminates upon bending. The invention composition has superior dispersion in comparison to standard polycarbonate polyethylene blends as shown by photomicrographs taken on an electron microscope. Finally, the invention composition has substantially more polyethylene covalently bonded to the polycarbonate than a composition prepared without an appropriate free radical initiator which brings about the bonding.

What is claimed is:

1. A composition comprising a modified amorphous polyester, selected from the group consisting of aromatic polycarbonate, aromatic copolyestercarbonate and polyarylate said modification being in the additional presence in the backbone of the polyester unsaturated aliphatic diester repeating units, the said modified polyester being covalently bonded to a polyolefin.

2. The composition in accordance with claim 1 wherein the composition also contains modified polyester in admixture with a polyolefin.

3. The composition in accordance with claim 1 wherein the modified polyester is a polycarbonate.

4. The composition in accordance with claim 1 wherein the polyolefin is selected from the group consisting of polyethylene, polypropylene, ethylene propylene copolymer, and styrene hydrogenated butadiene block, copolymer.

5. The composition in accordance with claim 3 wherein the polyolefin is polyethylene.

6. The composition in accordance with claim 3 wherein the polyolefin is polypropylene or polyethylene.

7. The composition in accordance with claim 3 wherein the polycarbonate is a bisphenol-A polycarbonate.

8. The composition in accordance with claim 7 wherein the polyolefin is polyethylene.

9. The composition in accordance with claim 7 wherein the polyolefin is polypropylene or polyethylene.

10. The composition in accordance with claim 7 wherein the unsaturated aliphatic diester is a fumaric ester.

11. The composition in accordance with claim 8 wherein the unsaturated aliphatic diester is a fumaric ester.

12. The composition in accordance with claim 9 wherein the polyolefin is polypropylene.

13. A process for preparing a composition comprising a polyolefin covalently bonded to a modified amorphous polyester selected from the group consisting of aromatic polycarbonate, aromatic copolyestercarbonate and polyarylate which comprises contacting
   (1) a polyolefin;
   (2) a free radical initiator effective at a temperature at which a polyolefin and modified polyester can be melt processed; and
   (3) a modified polyester said modification being the presence in the backbone of the polyester unsaturated aliphatic diester repeating units;
   said contacting carried out at a temperature sufficiently high so that both the polyolefin and modified polyester are melt processable together.

14. The process in accordance with claim 13 wherein the modified polyester is an aromatic polycarbonate.

15. The process in accordance with claim 13 wherein the polyolefin is selected from the group consisting of polyethylene, polypropylene, ethylene propylene copolymer, and styrene hydrogenated butadiene block copolymer.

16. The process in accordance with claim 15 wherein the polyolefin is polyethylene.

17. The process in accordance with claim 15 wherein the polyolefin is polypropylene or polyethylene.

18. The process in accordance with claim 14 wherein the polycarbonate is a bisphenol-A polycarbonate.

19. The process in accordance with claim 18 wherein the polyolefin is polyethylene.

20. The process in accordance with claim 18 wherein the polyolefin is polypropylene or polyethylene.

21. The process in accordance with claim 18 wherein the unsaturated aliphatic diester is a fumaric ester.

22. The process in accordance with claim 20 wherein the unsaturated aliphatic diester is a fumaric ester.

23. The process in accordance with claim 21 wherein the polyolefin is polypropylene.

* * * * *